United States Patent
Golasky et al.

(10) Patent No.: US 7,281,169 B2
(45) Date of Patent: Oct. 9, 2007

(54) METHOD, SOFTWARE AND SYSTEM FOR MULTI-PATH FAIL-OVER RECOVERY IN SEQUENTIAL STORAGE SYSTEMS

(75) Inventors: Richard Golasky, Round Rock, TX (US); Jacob Cherian, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 435 days.

(21) Appl. No.: 10/769,583

(22) Filed: Jan. 30, 2004

(65) Prior Publication Data

US 2005/0188239 A1    Aug. 25, 2005

(51) Int. Cl.
*G06F 11/00* (2006.01)
(52) U.S. Cl. .......................... 714/43; 714/44
(58) Field of Classification Search .............. 714/4, 714/43, 44, 56, 11, 13
See application file for complete search history.

(56) References Cited

U.S. PATENT DOCUMENTS

| | | | |
|---|---|---|---|
| 6,009,535 A | 12/1999 | Halligan et al. ............... 714/5 |
| 6,359,893 B1 * | 3/2002 | Mills .......................... 370/402 |
| 6,571,355 B1 | 5/2003 | Linnell ........................ 714/9 |
| 6,578,158 B1 * | 6/2003 | Deitz et al. .................. 714/11 |
| 6,625,747 B1 * | 9/2003 | Tawil et al. ................... 714/6 |
| 6,704,812 B2 * | 3/2004 | Bakke et al. ................. 710/38 |
| 6,804,703 B1 * | 10/2004 | Allen et al. ................. 709/216 |
| 7,003,687 B2 * | 2/2006 | Matsunami et al. ........... 714/4 |
| 2002/0065962 A1 * | 5/2002 | Bakke et al. ................. 710/38 |
| 2003/0137941 A1 | 7/2003 | Kaushik et al. ............. 370/241 |
| 2003/0200389 A1 * | 10/2003 | Odenwald ................... 711/114 |
| 2005/0134903 A1 * | 6/2005 | Tanimoto et al. .......... 358/1.15 |

* cited by examiner

*Primary Examiner*—Dieu-Minh Le
(74) *Attorney, Agent, or Firm*—Baker Botts L.L.P.

(57) ABSTRACT

A method, software and system are disclosed for enabling multi-path error recovery of failed communicators with sequential storage device systems. In one embodiment, an information handling system (IHS) coupled to a sequential storage device via first and second communication paths is provided. Information exchanges between the IHS and the sequential storage device are monitored for communication path failure. In response to a failure event on a primary communication path, status of the halted information exchange is maintained by a host bus adapter and its supporting software on the IHS and in a fibre channel interface module of the sequential storage device. Status information regarding the halted information exchange is communicated to a fail-over host bus adapter of the IHS. The information exchange is completed on the fail-over communications path beginning from the point of failure such that data of the sequential information exchange is maintained in order.

21 Claims, 2 Drawing Sheets

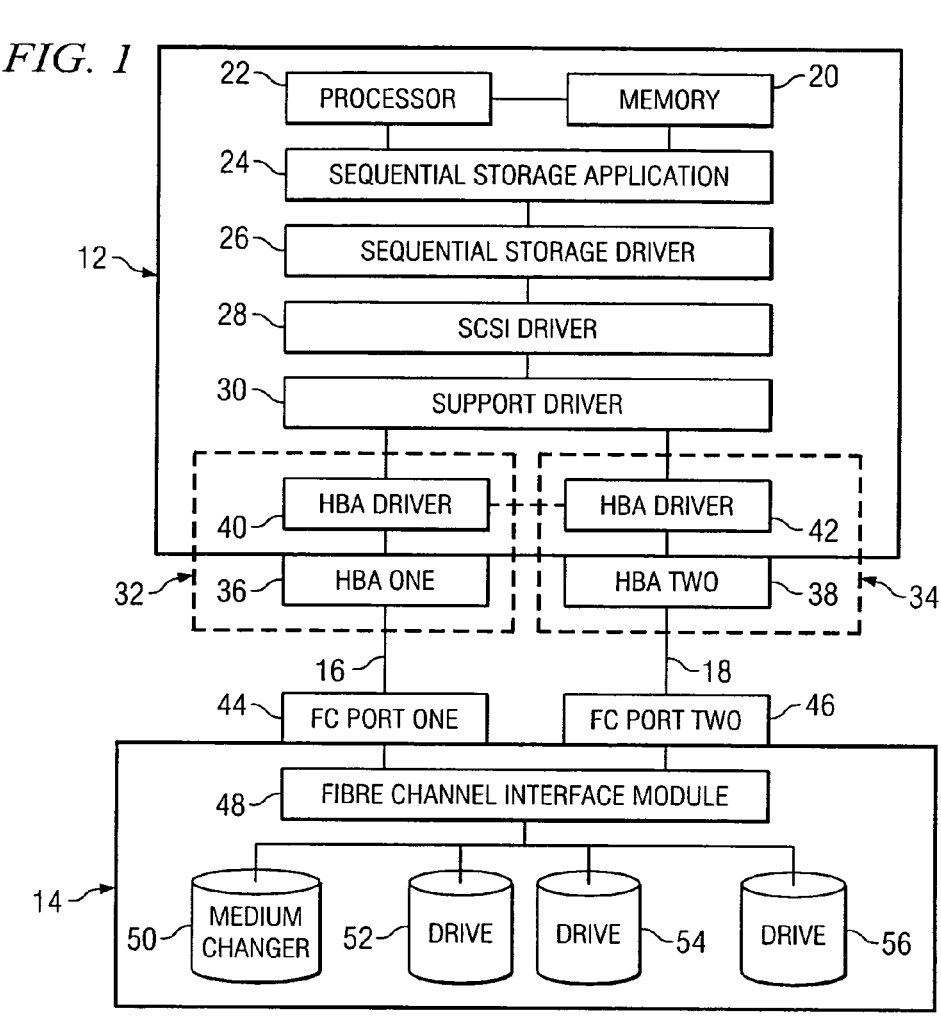

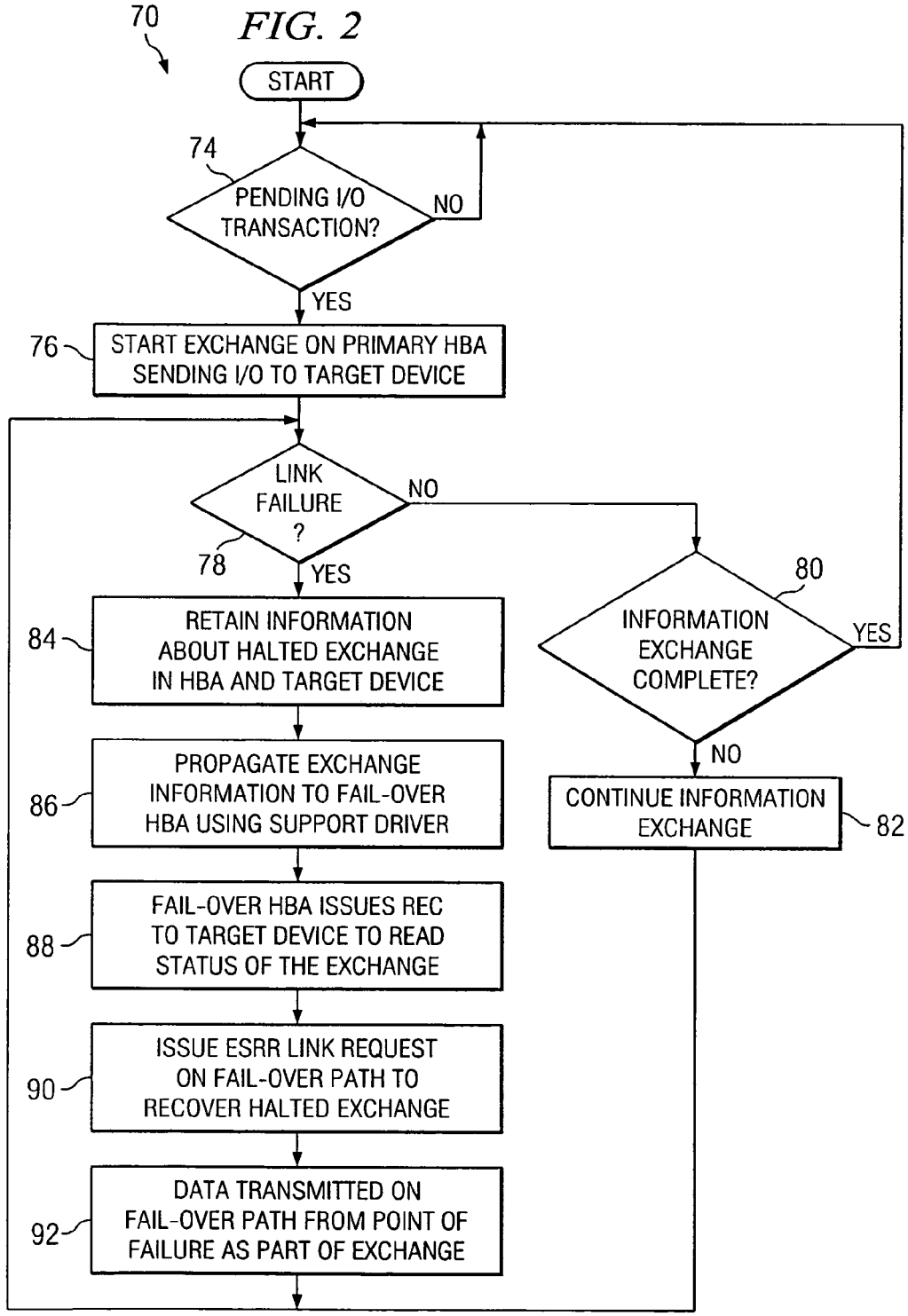

METHOD, SOFTWARE AND SYSTEM FOR MULTI-PATH FAIL-OVER RECOVERY IN SEQUENTIAL STORAGE SYSTEMS

TECHNICAL FIELD

The present invention relates generally to information handling systems and, more particularly, to information handling system recovery after communication path failures.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Host information handling system based multi-pathing software is used generally to provide high availability to storage when multiple paths exist through a fibre channel storage area network, for example. Such systems are commonly available for disk-based direct access devices. When a path to storage fails, the multi-path driver generally reroutes input/output (I/O) operations to the storage system through an available redundant or fail-over path. Since the device in this instance is direct access, the multi-path driver is generally not concerned about the status of any I/O operations that are interrupted as a result of a communication path failure. As a result, the multi-path driver will generally retry interrupted information exchanges assuming they were never completed.

In the case of sequential storage devices, e.g., tape drives, however, this mechanism of multi-path fail-over error recovery is insufficient. For example, in a sequential storage environment, if data was written to media and the communication path failed while an operation status was being returned, an attempt to retry the operation through the redundant path may cause data to be written twice, resulting in inconsistent data on the media. Further, in tape backup fibre channel environments, generally, there is no technology capable of rerouting error recovery operations for sequential devices from a failed primary path to a secondary or fail-over path. Current fibre channel recovery standards generally only define link error recovery procedures on the same path as an original information exchange.

SUMMARY

In accordance with teachings of the present disclosure, a method is described for recovering from a failure event on a communication path between an information handling system and a sequential storage device. The method preferably includes monitoring the communication path during an information exchange for a failure event. The method preferably also includes marking, in response to detection of a failure event, a point in the information exchange at which the failure event occurred. In addition, the method preferably includes initiating a continuation of the information exchange from the point of failure on a fail-over communication path between the information handling system and the sequential storage device.

Also in accordance with teachings of the present disclosure, software for completing a transaction between a sequential storage device and a host information handling system after a failure event on a communication path between the sequential storage device and the host information handling system is provided. According to teachings of the present disclosure, the software is preferably embodied in computer-readable media and when executed, operable to detect a failure event on the communication path. The software is preferably further operable to retain information concerning at least one open exchange being communicated on the communication path and to retrieve an exchange status indicating a point in the exchange at which the failure event occurred. Further, the software is also preferably operable to continue communication of the exchange based on the exchange status on a fail-over path between the host information handling system and the sequential storage device.

Further in accordance with teachings of the present disclosure, an information handling system including at least one processor, memory operably coupled to the processor and at least one communication device operably coupled to the processor and the memory is disclosed. The communication device is preferably operable to communicate data on at least one communication path. In addition, the information handling system preferably also includes a program of instructions storable in the memory and executable by the processor. The program of instructions is preferably operable to mark a point of failure in an information exchange with a sequential storage device in response to a communication path failure. The program of instructions is preferably further operable to facilitate communication of the information exchange with the sequential storage device from the point of failure on a fail-over communication path.

In a first aspect, teachings of the present disclosure solve the problem of multi-path fail-over in sequential storage device environments by providing a mechanism through which an interrupted information exchange or sequence can be recovered from the point of failure using a fail-over or redundant communication path.

In a second aspect, teachings of the present disclosure minimize or eliminate inconsistent data written to sequential storage devices in response to attempts to recover from communication path failure events.

In a third aspect, the multi-path fail-over teachings of the present disclosure may be implemented in a manner that makes the fail-over protection transparent to a host based tape backup software application originating communications.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 is block diagram illustrating one embodiment of a fibre channel sequential storage system and connected host information handling system incorporating teachings of the present disclosure;

FIG. 2 is a flow diagram illustrating one embodiment of a method for implementing multi-path fail-over error recovery in sequential storage systems incorporating teachings of the present disclosure; and FIG. 3 is a representation of one embodiment of a fibre channel extended sequence retransmission request link service command incorporating teachings of the present disclosure.

DETAILED DESCRIPTION

Preferred embodiments and their advantages are best understood by reference to FIGS. 1 through 3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring first to FIG. 1, a block diagram illustrating one embodiment of a multi-path information handling system and sequential storage device configuration is shown. According to teachings of the present disclosure, system 10 is preferably operable to overcome problems associated with communication path failure events during sequential storage device communications, write, read, advance, rewind, as well as other operations. In a preferred embodiment, teachings of the present disclosure solve problems associated with communication path failures during communications with a sequential storage device by providing a mechanism through which an interrupted information exchange or sequence may be recovered from its point of failure using redundant or fail-over communication paths.

As illustrated in FIG. 1, system 10 preferably includes information handling system 12 and at least one sequential storage device 14. In one embodiment, information handling system 12 may be coupled to sequential storage device 14 via primary communication path 16 and at least one redundant, secondary or fail-over communication path 18. The technology on which communication paths 16 and 18 are based is SCSI (small computer systems interface) over fibre channel, fibre channel or any protocol that transmits fibre channel. While the present disclosure makes reference to fibre channel communications, teachings of the present disclosure may be utilized with other technologies in existence and technologies currently in development.

Information handling system 12 preferably includes memory 20. Memory 20 is preferably operable to store one or more instructions for execution in processor 22, as well as to store one or more aspects of data or information that can be utilized by information handling system 12. Processor 22 is preferably coupled to memory 20. In a preferred embodiment, processor 22 is preferably operable to communicate information or data maintained in memory 20 as well as to execute one or more instructions maintained by memory 20 or elsewhere in information handling system 12, such as in one or more hard disk drive devices (not expressly shown) or sequential storage device 14.

Also preferably included in information handling system 12, operably associated with memory 20 and processor 22, is sequential storage application 24. Sequential storage application 24 may be generally defined as a program of instructions designed to assist the performance of tasks related to management and manipulation of sequential storage device 14.

In addition to sequential storage application 24, information handling system 12 preferably also includes sequential storage driver 26 operably associated with processor 22 and memory 20. Sequential storage driver 26 may be generally defined as a program of instructions or hardware device operable to control or regulate sequential storage device 14. In general, sequential storage driver 26 preferably handles specific features of sequential storage device 14, freeing the operating system running on information handling system 12 from the burden of having to understand and support the needs of sequential storage device 14.

SCSI (small computer systems interface) driver 28 is also preferably included in information handling system 12, operably associated with memory 20 and processor 22. In one embodiment of the present disclosure, communication paths 16 and 18 may be implemented using SCSI over fibre channel. SCSI driver 28 may be employed to regulate one or more aspects of SCSI communications over communication paths 16 and 18 as well as to perform other tasks in association with sequential storage device 14 or other components operably coupled to information handling system 12.

Also preferably coupled to memory 20 and processor 22 is support driver 30. In one embodiment of teachings of the present disclosure, support driver 30 preferably facilitates one or more aspects of the multi-path error recovery procedure for sequential storage systems as disclosed herein. Support driver 30 is preferably tightly coupled to HBA drivers 40 and/or 42 or may be integrated into HBA drivers 40 and/or 42. Additional detail regarding the operation of support driver 30 with respect to multi-path error recovery in sequential storage device communications is discussed in greater detail below.

Communication devices 32 and 34 are also preferably included in information handling system 12 and operably coupled to memory 20 and processor 22. In one embodiment, communication devices 32 and 34 preferably include host bus adapters (HBA) 36 and 38 and one or more associated HBA drivers 40 and 42, respectively. In one embodiment of information handling system 12, HBA 36 and 38 may generally be defined as devices, typically in the form of an expansion card, for connecting a peripheral, e.g., sequential storage device 14, to information handling system 12. As mentioned above, host bus adapters 36 and 38 may employ fibre channel, SCSI, SCSI over fibre channel, as well as other communication protocols. Similar to sequential storage driver 26 and SCSI driver 28, HBA driver 40 and/or 42 may generally be defined as a hardware device and/or program of instructions that controls or regulates HBA 36 and 38, respectively. If a driver is implemented in software, the software driver may be generally defined as a device specific control program enabling an information handling system to work with another information handling system, e.g., sequential storage device 14.

As illustrated in FIG. 1, sequential storage device 14 preferably includes first and second fibre channel ports 44 and 46, respectively. Sequential storage device 14 may also include ports in addition to fibre channel ports 44 and 46, in alternate embodiments. As shown in FIG. 1, communication paths 16 and 18 connect information handling system 12 to sequential storage device 14 via connections between HBA 36 and fibre channel port 44 as well as between HBA 38 and fibre channel port 46.

Sequential storage device 14 preferably also includes fibre channel interface module 48. In one aspect, fibre channel interface module 48 is preferably operable to receive communications from information handling system 12 via communication path 16 and/or 18 such that information handling system 12 may communicate with medium changer 50 as well as sequential drives 52, 54 and 56. In addition, as is described in greater detail below, fibre channel interface module 48 preferably cooperates with support driver 30 as well as HBA 36 and/or 38 to effect multi-path fail-over error recovery.

Referring now to FIG. 2, a flow diagram illustrating one embodiment of a method for implementing multi-path fail-over error recovery in sequential storage system is shown. In one aspect, teachings of the present disclosure describe an enhanced method of error recovery utilizing a fail-over path to recover interrupted information exchanges from the point of failure between an information handling system and a sequential storage device.

In the operation of method 70, if communication path 16 fails during an information exchange between information handling system 12 and sequential storage device 14, software and/or firmware on HBA 36 and/or on fibre channel interface module 48 of sequential storage device 14 will preferably detect the error condition. When the error is detected, HBA driver 40, support driver 30 and fibre channel interface module 48 of sequential storage device 14 preferably retain, mark or otherwise note the state or point of failure of all open exchanges between information handling system 12 and sequential storage device 14 as well as information about one or more logged-in devices, to permit later error recovery. To protect against failed communications on communication path 16 due to failure of HBA 36, HBA driver 40 and support driver 30 is preferably operable to maintain awareness of each pending information exchange being communicated thereon.

In an effort to effect error recovery procedures, the support driver 30 will preferably propagate information about open exchanges at the point of failure to HBA 42 on fail-over or redundant communication path 18. In a preferred embodiment, the information propagated by support driver 30 regarding open information exchanges preferably includes information regarding an originator exchange identifier (OX_ID), a receiver exchange identifier (RX_ID) and a port identifier (ID) of the initiator. Once communicated to sequential storage device 14, the originator exchange ID (OX_ID), receiver exchange ID (RX_ID) and port ID of the initiator may be used by sequential storage device 14 to uniquely identify an interrupted information exchange. In addition to passing information associated with the halted or interrupted information exchanges, HBA driver 40 and support driver 30 preferably also pass a pointer to a data buffer containing the information to be communicated in the halted or interrupted information exchange.

With the information concerning the open or halted information exchanges available, the error recovery process preferably continues with the information exchange originator issuing a read exchange concise (REC) extended link service command containing the originator exchange ID (OX_ID), the receiver exchange ID (RX_ID) and the port ID of the initiator of the halted information exchange. Upon receipt of the REC extended length service command, sequential storage device 14 will preferably retrieve from one or more fibre channel exchange buffers maintained thereon the information exchange status based on the contents of the REC extended length service command. In a preferred embodiment, sequential storage device 14 will preferably respond to the REC extended length service command with information retrieved from its buffers indicating the status as it pertains to sequential storage device 14 of an associated halted or interrupted information exchange.

Upon receipt of the response from sequential storage device 14 indicating its recorded, marked or otherwise noted status of an interrupted or halted information exchange, HBA 38, via fail-over or redundant communications path 18, preferably issues an extended length service command to begin the recovery process. In a preferred embodiment, the extended length service command is an extended sequence retransmission request (ESRR). ESRR is one embodiment of a Fibre Channel-4 link service command based on the sequence retransmission request (SRR) Fibre Channel-4 link service request defined in the SCSI over fibre channel protocol.

Referring specifically now to method 70 of FIG. 2, upon initiation at 72, method 70 preferably proceeds to 74. At 74, method 70 preferably provides for the determination as to whether an I/O (input/output) transaction or information exchange is pending on a primary HBA of information handling system 12, such as host bus adapter 36. If an I/O transaction or information exchange is not pending at 74, method 70 preferably loops and awaits detection of a pending I/O transaction or information exchange. Alternatively, if a pending I/O transaction or information exchange is detected at 74, method 70 preferably proceeds to 76.

In one embodiment, operations performed prior to the operations performed at 76 of method 70 may include determining whether primary communications path, such as communication path 16, is operable. In one embodiment, determining whether a communication path is operable may include, but is not limited to, determining whether a host bus adapter associated with the primary communication path is operable as well as determining whether the communication path itself communicatively couples information handling system 12 to sequential storage device 14, for example.

At 76, the pending I/O transaction information exchange detected at 74 is preferably initiated on the primary host bus adapter via the primary communication path. In one embodiment, initiation of an information exchange or I/O transaction between information handling system 12 and sequential storage device 14 may include the transmission of a request from information handling system 12 to sequential storage device 14 for sequential storage device 14 to identify its receiver exchange ID (RX_ID). Upon return of the sequential storage device 14 receiver exchange ID (RX_ID), information handling system 12 may initiate an information exchange with sequential storage device 14.

In conjunction with initiating an information exchange or I/O transaction on the primary host bus adapter and communication path of system 10, method 70 preferably provides for substantially continues monitoring of at least the primary communication path, such as communication path 16, for a failure event. In one embodiment, HBA driver 40 may monitor one or more aspects of HBA 36 as well as one or more aspects of communication path 16 for one or more failure events indicative of an inability to communicate between information handling system 12 and sequential storage device 14 via host bus adapter 36 and/or communication path 16. If at 78 no failure in the link or communication path is detected, method 70 preferably proceeds to 80 where a determination may be made as to whether the pending or current information exchange has been completed. Determination as to whether pending or current information exchange has been completed may include, but is not limited to, determining whether an acknowledgment has been received from sequential storage device 14 indicating that sequential storage device 14 has received the last portion of the information exchange or an indication that all data to be communicated has been communicated.

If at 80 it is determined that the pending or current information exchange has not completed, method 70 preferably proceeds to 82 where the information exchange is preferably continued. In conjunction with continuing the information exchange at 82, method 70 preferably provides for continued monitoring of the primary communication path and host bus adapter facilitating the information exchange between information handling system 12 and sequential storage device 14. In a preferred embodiment, the communication link(s) of system 10 may be monitored for failure without interruption to an open information exchange, eliminating a need for the affirmative operations preferably performed at 80 and 82. Alternatively, if at 80 it is determined that the information exchange has been completed, method 70 preferably returns to 74 where the next I/O transaction or information exchange may be awaited.

If at 78, a link or communication path failure is detected during an information exchange, method 70 preferably proceeds to 84. At 84, according to teachings of the present disclosure, HBA driver 40 and support driver 30 are preferably configured to retain information concerning the state of all open information exchanges between information handling system 12 and sequential storage device 14. In addition, fibre channel interface module 48 of sequential storage device 14 is preferably also configured to retain or mark information associated with the state of all open information exchanges associated therewith in one or more buffers preferably included on sequential storage device 14. In addition to retaining information associated with the state of all open exchanges of information handling system 12 and sequential storage device 14, information concerning one or more logged-in devices or devices communicatively coupled to information handling system 12 or sequential storage device 14 may also be stored by HBA driver 40, support driver 30 and/or fibre channel interface module 48, respectively.

Following the marking or retention of information associated with one or more open information exchanges between information handling system 12 and sequential storage device 14 at 84, method 70 preferably proceeds to 86. At 86, support driver 30 preferably communicates the information it has retained regarding the halted or open information exchanges to HBA driver 42 associated with HBA 38 which is preferably operably coupled to fail-over or redundant communication path 18.

In one embodiment, the information communicated by support driver 30 from HBA driver 40 to HBA driver 42 includes, but is not limited to, an originator exchange ID (OX_ID), a receiver exchange ID (RX_ID) and the port ID of the initiator, e.g., a twenty-four (24) bit fibre channel ID. In the fibre channel protocol, as well as in the SCSI over fibre channel protocol, information exchange target device, such as sequential storage device 14 in a situation where information handling system 12 is attempting to write data to one or more drives 52, 54 and/or 56 of sequential storage device 14, may use the originator exchange ID (OX_ID), receiver exchange ID (RX_ID) and port ID of the initiator to uniquely identify a halted or open exchange. In addition to communicating the originator exchange ID (OX_ID), receiver exchange ID (RX_ID) and port ID of the initiator, support driver 30 preferably also communicates a pointer to a data buffer containing information that was being propagated in the halted information exchange.

Following communication of the originator exchange ID (OX_ID), receiver exchange ID (RX_ID) and port ID of the initiator, method 70 preferably proceeds to 88. At 88, the fail-over host bus adapter, such as HBA 38, cooperating with HBA driver 42 and support driver 30 preferably issues a read exchange concise (REC) extended link service command to the target device of an information exchange, such as sequential storage device 14, requesting the target device read its marked or retained status of the halted or open information exchange. In a preferred embodiment, the REC extended link service command preferably includes the originator exchange ID (OX_ID), receiver exchange ID (RX_ID) and port ID of the initiator associated with the halted or interrupted information exchange desired to be recovered and completed. Upon receipt of the REC extended link service command from information handling system 12, sequential storage device 14, specifically fibre channel interface module 48 in a preferred embodiment, will preferably retrieve from one or more buffers included thereon its marked or retained status of the halted information exchange based on the contents of the REC extended link service command contents associated with the halted or interrupted information exchange. After retrieving the marked or retained status information concerning the interrupted or halted information exchange, the target device, such as sequential storage device 14, preferably responds to the REC extended link service command with data indicating fibre channel interface module 48 buffer contents associated with a sequential storage device 14 recorded status of the interrupted or halted information exchange.

Upon receipt of a response from sequential storage device 14 to the REC extended link service command communicated by information handling system 12, method 70 preferably proceeds to 90. At 90, information handling system 12 preferably issues an extended sequence retransmission request (ESRR) extended link service command to initiate recovered communication of the halted or interrupted information exchange on the fail-over communication path using the fail-over host bus adapter preferably included on information handling system 12. In general, an ESRR extended link service command effectively restarts a halted or interrupted communication exchange from the point of failure noted, marked and/or retained by HBA driver 40 and/or fibre channel interface module 48 in response to detection of a communication failure between information handling system 12 and sequential storage device 14.

Following the issuance of an ESRR extended link service command at 90, method 70 preferably proceeds to 92 where the information remaining to be communicated in the halted or interrupted information exchange is preferably transmitted on the fail-over or redundant communication path from the detected point of failure to completion. As with the continued information exchange communications at 80, following initiation of retransmission of remaining portions of a halted or interrupted information exchange at 92, method 70 preferably provides for continued monitoring of the fail-over or redundant communication path preferably included between information handling system 12 and sequential storage device 14.

Although not explicitly shown, one or more additional operations may be included in method 70 to address additional aspects of communication path failures between information handling system 12 and sequential storage device 14. For example, provision may be made for the exhaustion of redundant or additional fail-over communication paths between information handling system 12 and sequential storage device 14 such that once each communication path between information handling system 12 and sequential storage device 14 has been determined to have failed communications, method 70 may provide for the retention of information associated with each halted or interrupted information exchange and provision of error recovery options similar to those above upon the detection of re-established communications between information handling system 12 and sequential data storage device 14.

Referring now to FIG. 3, one embodiment of an extended sequence retransmission request (ESRR) extended link service command is shown generally at 100. As indicated in FIG. 3, one embodiment of an ESRR extended link service command includes five thirty-two-bit (32-bit) words. As indicated at 102, bits zero through thirty-one (31) of word zero (0) preferably include a command identifier. The command identifier indicates that this command is an ESRR. In a preferred embodiment, substantially all commands executable between information handling system 12 and sequential data storage device 14 via the fibre channel protocol, SCSI over fibre channel protocol, as well as other protocols may be effected.

In addition to command identifier 102, ESRR extended link service command 100 preferably also includes, in word one (1), the originator exchange ID (OX_ID) 104 and the receiver exchange ID (RX_ID) 106 at bits sixteen (16) through thirty-one (31) and zero (0) through fifteen (15), respectively. At bits zero (0) through thirty-one (31) of extended link service command word two (2), the ESRR extended link service command word 100 preferably includes a sequence restart offset. In one embodiment, the sequence restart offset indicates the point at which the interrupted or halted information exchange should be restarted. Conceptually, sequence restart offset 108 may be generically defined as a pointer to the starting point for the recovery of communications between information handling system 12 and sequential data storage device 14 regarding the halted or interrupted information exchange. At bits twenty-four (24) through thirty-one (31) of ESRR extended link service command word three (3), routing control information incorporated in the fibre channel protocol, the SCSI protocol and/or the SCSI over fibre channel protocol may be included. The routing control filed is as described in FC-FS and tells what phase of a fibre channel exchange needs to be recovered, e.g., data descriptor, command status, solicited data, etc. At 112, the port ID of the initiator is preferably included at bits eight (8) through thirty-one (31) of ESRR extended link service command 100 word four (4).

Although the disclosed embodiments have been described in detail, it should be understood that various changes, substitutions and alterations can be made to the embodiments without departing from their spirit and scope.

What is claimed is:

1. A method for recovering from a failure event on a communication path between an information handling system and a sequential storage device, comprising:
   monitoring the communication path during an information data exchange for a failure event;
   in response to detection of a failure event, using an identifier to indicate a location in the information data exchange at which the failure event occurred; and
   initiating a continuation of the information data exchange from the location of failure on a fail-over communication path between the information handling system and the sequential storage device.

2. The method of claim 1, further comprising indicating the location of failure in a host bus adapter of the information handling system.

3. The method of claim 1, further comprising indicating the location of failure in the sequential storage device.

4. The method of claim 1, further comprising communicating the location of failure to a fail over host bus adapter on the information handling system using a support driver.

5. The method of claim 1, wherein the identifier comprises at least one of an originator exchange identifier, a receiver exchange identifier and a port identifier.

6. The method of claim 1, further comprising querying the sequential storage device by the information handling system for identification of its indicating the location of failure.

7. The method of claim 6, further comprising initiating continuation of the information data exchange based on sequential storage device query results.

8. The method of claim 1, further comprising passing a pointer to a buffer including contents of the information data exchange from a host bus adapter associated with the failed communication path to a fail over host bus adapter associated with a fail over communication path.

9. Software for completing a transaction between a sequential storage device and a host information handling system after a failure event on a communication path between the sequential storage device and the host information handling system, the software embodied in computer readable media and when executed operable to:
   detect a failure event on the communication path;
   retain information concerning at least one open exchange being communicated on the communication path;
   retrieve an exchange status using an identifier to indicate a location in the information data exchange at which the failure event occurred; and
   continue communication of the exchange based on the exchange status on a fail over path between the host information handling system and the sequential storage device.

10. The software of claim 9, further operable to query the sequential storage device for the exchange status indicating the location in the information data exchange at which the failure event occurred.

11. The software of claim 9, further operable to:
   read open exchange information from a host bus adapter associated with the failed communication path; and communicate the open exchange information to a host bus adapter associated with the fail over communication path.

12. The software of claim 9, further operable to monitor continued communication of the exchange for an acknowledgment of exchange completion.

13. The software of claim 9, further operable to buffer data received in the exchange communication at the sequential storage device.

14. The software of claim 9, further operable to retain information concerning at least one open exchange on the host information handling system and the sequential storage device.

15. An information handling system, comprising:
   at least one processor;
   a memory operably coupled to the processor;
   at least one communication device operably coupled to the processor and the memory, the communication device operable to communicate data on at least one communication path; and
   a program of instructions storable in the memory and executable by the processor, the program of instructions operable to use an identifier to indicate a location of failure in an information data exchange with a sequential storage device in response to a communication path failure and facilitate communication of the information data exchange with the sequential storage device from the location of failure on a fail over communication path.

16. The information handling system of claim 15, further comprising the program of instructions operable to respond to a query concerning the information data exchange location of failure.

17. The information handling system of claim 15, further comprising the program of instructions operable to query the sequential storage device to identify the information data exchange location of failure.

18. The information handling system of claim 15, further comprising the program of instructions operable to communicate data concerning the information data exchange to communication hardware associated with the fail over communication path.

19. The information handling system of claim 15, wherein the identifier includes at least one of an originator exchange identifier, a receiver exchange identifier and a port identifier.

20. The information handling system of claim 15, further comprising:
   a first host bus adapter operable to communicate with the sequential storage device along a first communication path;
   a second host bus adapter operable to communicate with the sequential storage device along a second communication path; and
   at least one host bus adapter operable to retain an exchange state for at least one open exchange being communicated on an associated communication path.

21. The information handling system of claim 15, further comprising:
   a fibre channel interface module operable to receive at least one information data_exchange on a communication path; and
   the fibre channel interface module operable to retain an exchange state for at least one open exchange communicated on the communication path.

* * * * *